United States Patent [19]

Gyugyi et al.

[11] 4,188,573

[45] Feb. 12, 1980

[54] STATIC VAR GENERATOR WITH TIME-RELATED-ERROR MINIMIZER

[75] Inventors: Laszlo Gyugyi, Penn Hills; Michael B. Brennen, Wilkins Township, Allegheny County, both of Pa.

[73] Assignee: Westinghouse Electric Corp., Pittsburgh, Pa.

[21] Appl. No.: 892,804

[22] Filed: Apr. 3, 1978

[51] Int. Cl.$^2$ ............................................. H02J 3/18
[52] U.S. Cl. .................................................. 323/119
[58] Field of Search ............... 323/101, 102, 106, 108, 323/109, 110, 119, 124, 127, 128; 13/12, 13; 219/108, 110, 112, 113, 114, 115, 131 R

[56] References Cited

U.S. PATENT DOCUMENTS

| | | | |
|---|---|---|---|
| 3,936,727 | 2/1976 | Kelley, Jr. et al. | 323/102 |
| 3,940,687 | 2/1976 | Akhundov et al. | 323/101 |
| 3,987,359 | 10/1976 | Thompson | 323/124 |
| 3,987,360 | 10/1976 | Brennen et al. | 323/101 |
| 4,000,455 | 12/1976 | Gyugyi et al. | 323/119 |
| 4,068,159 | 1/1978 | Gyugyi | 323/119 |

Primary Examiner—A. D. Pellinen
Attorney, Agent, or Firm—M. J. Moran

[57] ABSTRACT

A control circuit for a static VAR generator measures appropriate circuit variables during consecutive half cycles of line voltage. This information is utilized to determine the firing angles of the VAR generator thyristors for providing compensating current to the line for keeping the source current in phase with the source voltage, for balancing source current in three-phase electrical systems and for reducing the line voltage fluctuation. A time-related-error minimizer is provided in the control system of the VAR generator to reduce the deviation between the amount of compensating current which is predicted for proper compensation during a given half cycle and the actual amount of compensating current needed at the time of application. The error is related to the differential between the time of the calculation of the value of current needed and the time it is actually applied. In one case, an open loop-type computational technique is utilized to determine the required inductor current. In a second case, a feedback control for reducing error utilizes the desired or predicted current and the actual inductor current; and in a third case, the compensating error signal is indirectly determined by utilizing the difference between the instantaneous AC terminal voltage and its steady state average value. The error signal associated with the latter case is combined with the computed desired inductor current to reduce time related terminal voltage variations.

29 Claims, 5 Drawing Figures

STATIC VAR GENERATOR WITH TIME-RELATED-ERROR MINIMIZER

CROSS-REFERENCE TO RELATED APPLICATIONS

The subject matter of this invention is related to certain other inventions described in concurrently filed copending applications: Ser. No. 892,805, entitled "Static VAR Generator With Non-Linear Frequency Dependent Dynamic Gain Adjuster"; and Ser. No. 892,556, entitled "Voltage Regulator and Flicker Compensator".

BACKGROUND OF THE INVENTION

This invention relates generally to VAR generators and it relates in particular to control systems for VAR generators which utilize time-related-error minimizers.

Static VAR generators compensate for the effects of highly reactive loads, such as arc furnaces, on the terminal variables of an AC supply system. The static VAR generator or flicker compensator, as it is sometimes called, includes a control circuit which measures the magnitudes of arc furnace currents in consecutive half cycles of the line or supply voltage. The measured information is used to compute necessary compensating currents in terms of required firing angle signal ($\alpha$) for the thyristors of the static VAR generator. The static VAR generator is adjusted only once during each half cycle per phase. Generally, prior art concerning static VAR generators is directed towards apparatus and method for determining the proper firing angle for the inductor controlled thyristors of the VAR generator. The trend in the prior art is in a direction from apparatus associated with the determination of the firing angle by any means whatsoever towards apparatus for determining the firing angle at a point in time as close as possible to the actual firing of the thyristors. Examples of that trend can be found by examining the following U.S. Patent in sequence. U.S. Pat. No. 3,936,727, issued Feb. 3, 1976 to F. W. Kelly, Jr. and G. R. E. Lezan, teaches a compensation control device which determines firing time for a static switch in accordance with the magnitudes of the reactive load current and which additionally teaches a regulating means which controls the firing time to maintain the line current and line voltage at a selected line location in substantial phase coincidence. U.S. Pat. No. 3,999,117, issued Dec. 21, 1976 to Gyugyi et al, teaches a static VAR generator and compensator where time delayed firing angles are calculated by integrating furnace load currents over predescribed intervals during real time to thus maintain balanced load current at specified phase angles, which are usually zero for a three-phase electrical system. U.S. Pat. No. 4,000,455, issued Dec. 28, 1976 to Gyugyi et al, teaches that the total computation time for determining the firing angle in each succeeding half cycle will take no longer than the length of time of the last complete half cycle immediately prior to (measured at voltage peak) the firing of the thyristor. U.S. Pat. No. 4,068,159 issued Jan. 10, 1979 to L. Gyugyi teaches that the computation time for determining the firing angle can actually extend into the half cycle in which correction is to be applied. A copending application, Ser. No. 880,270 also by Gyugyi et al, teaches that the computation time for determining the firing angle is extended even further into the half cycle into which correction is to be applied. It has been noted, however, that the accurate, reliable, timely determination of firing angle from circuit variables becomes relatively less significant if the transport time or the delay time of the control system through which is information must be propagated is too long to allow the control system to respond to the frequency of the load disturbance for which the VAR generator is provided to correct. It follows, therefore, that the compensating current provided by the VAR generator tends to lag the load current which it is to compensate. This delay, which separates the load current demanded and the one actually provided by the VAR generator, introduces an error in load compensation, the magnitude of which increases with the frequency of load variation. As a consequence, the effectiveness of a VAR generator for load compensation can rapidly decrease as the frequency of load variation increases. It would be desirable, therefore, to provide a VAR generator control system where reduction in this error is provided.

SUMMARY OF THE INVENTION

In accordance with the invention, apparatus is provided for reducing the error in a VAR generator control system associated with time delay, transport lag, or the like. The apparatus which is provided for accomplishing this purpose is called a time-related-error minimizer. Three embodiments are provided for the minimizer. In one embodiment, the error prediction is based on past history, that is, from previously desired inductor currents, a corrected inductor current is computed which gives more accurate compensation a half cycle later when it is actually applied. In another embodiment of the invention, the compensation error produced by the time delay between the computation of a desired inductor current and the actual application of the inductor current to the line to be controlled can be reduced by closed loop control apparatus. An error signal is developed that is proportional to the difference between the computed and applied inductor currents. This signal is then used in a feedback loop to modify the firing angle of the thyristor switch for the next application of compensating current. In the third embodiment of the invention, the compensation error of the VAR generator can be reduced by providing apparatus which indirectly detects the instantaneous deviation of the magnitude of the terminal voltage from its steady state value to provide an error signal, and then by utilizing the error signal in a feedback loop to modify the desired inductor current, to thus reduce the voltage deviation.

BRIEF DESCRIPTION OF THE DRAWINGS

For a better understanding of the invention, reference may be had to the preferred embodiments thereof shown in the accompanying drawings, in which.

DESCRIPTION OF THE PREFERRED EMBODIMENTS

Figure 1:
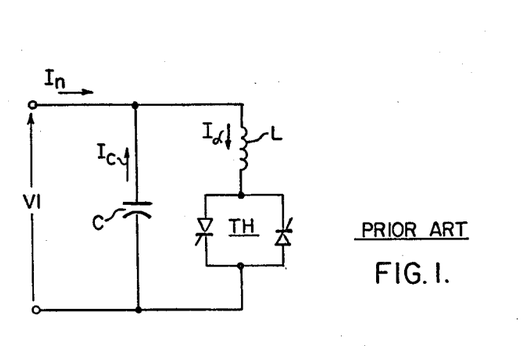
FIG. 1 shows a prior art static VAR generator power circuit.

Referring now to the drawings and prior art FIG. 1 in particular, there is shown a basic VAR generator for a single phase AC electrical system. In general, the VAR generator consists of a fixed capacitor C and a thyristor controlled inductor L. At zero leading VAR demand, the thyristor switch TH is closed and the inductive effect of the inductor L cancels the capacitive effect of the capacitor C so that the net current $I_n$ provided for the AC system is zero. That is, the algebraic sum of the capacitor current $I_C$ and the inductor current $I\alpha$ is equal to zero. The voltage across the parallel combination which includes the capacitive element C and inductive element L, and the serially connected thyristor switch TH is equal to V1. At some non-zero leading VAR demand, the closing of the switch TH is appropriately delayed in each half cycle of the alternating current by a variable angle which shall be called the firing angle $\alpha$ which is measured with respect to the peak of the supply voltage V1 in order to reduce the current $I\alpha$ flowing in the inductor L.

Figure 2:
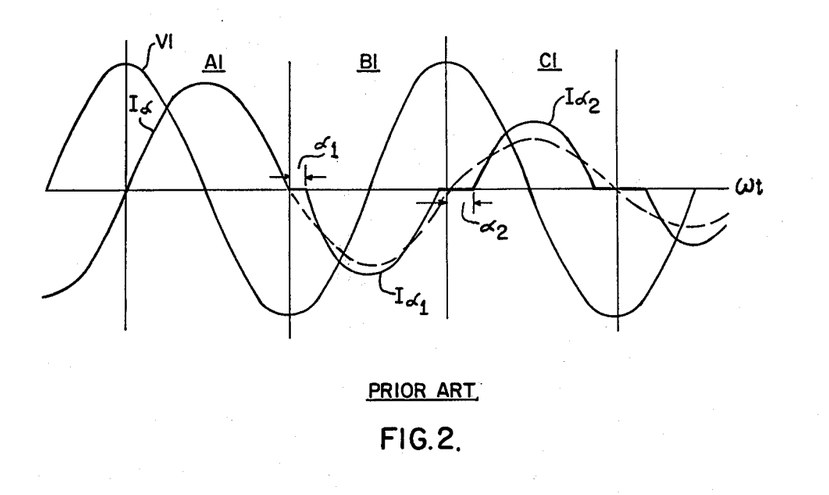
FIG. 2 shows VAR generator voltage and controlled inductor current vs. $\omega t$ for the apparatus of FIG. 1.

Referring now to FIG. 2, there is shown a plot of voltage V1 and current $I\alpha$ versus $\omega t$. The curves of FIG. 2 are arbitrarily divided into three zones designated A1, B1, and C1, each of which begins with the maximum positive or negative value of V1 in each half cycle as the case may be. It will be noted that in region A1, the inductor current $I\alpha$ lags the inductor voltage V1 by 90° and the firing angle $\alpha$ is zero. However, with an increasing firing angle $\alpha$ in the region between zero and 90°, the inductive current $I\alpha$ decreases and consequently, the leading VAR provided for the AC system increases. At the maximum leading VAR demand, the switch TH of FIG. 1 is fully opened. This occurs at $\alpha=90°$. When this happens, the current $I\alpha$ in the inductor L in FIG. 1 is zero and therefore, the maximum rated capacitive current $I_C$ is provided for compensation. FIG. 2 shows in region B1 that for a delay or firing angle $\alpha_1$, the inductive current $I_{\alpha 1}$ flows for a shorter period of time than the current $I\alpha$ shown in region A1. Likewise, in region C1 where the firing angle or delay is $\alpha_2$ (where $\alpha_2$ is greater than $\alpha_1$ in this case). The inductor current $I_{\alpha 2}$ flows for an even shorter period of time than those inductive currents $I\alpha$ and $I_{\alpha 1}$ shown in regions A1 and B1, respectively.

Figure 3:
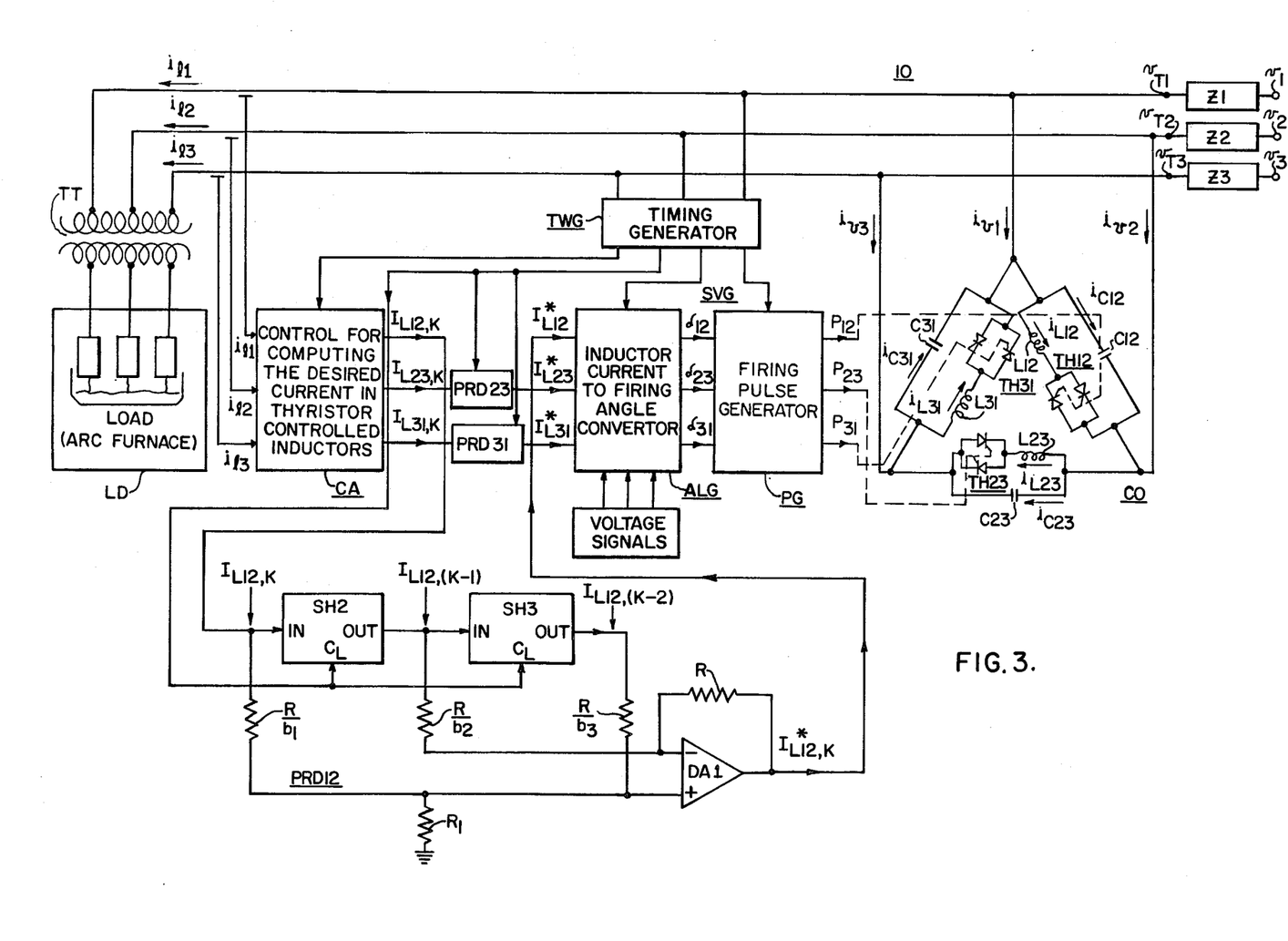
FIG. 3 shows a static VAR generator control system in which previously stored current values are utilized for predicting compensating current.

Referring now to FIG. 3, compensation error reduction by utilization of a prediction apparatus is described. For purposes of simplicity of illustration, many of the functions associated with each phase of the three-phase system shown in FIG. 3 will be described with respect to phase 1-2 only. It is to be understood that the teachings apply equally well for the other phases, and in fact, apply for multi-phase systems greater than three-phase. In the process of VAR generation control, the magnitude of the desired inductor current $I_{L12}$ is computed from load currents $i_{l1}$ and $i_{l2}$, for instance, in each half cycle prior to the beginning of the next successive firing interval. The desired inductor current $I_{L12}$ is thus converted into a firing angle $\alpha_{12}$ for for the thyristor switch TH12. The firing angle $\alpha_{12}$ is the one which is determined by a calculation technique or otherwise to be suitable to establish sufficient current flow $i_{L12}$ in the thyristor controlled inductor $L_{12}$ to provide effective compensation. In the present invention the magnitude of the desired compensating inductor current for a later half cycle is calculated in a present half cycle. To this value is applied a compensating error correction factor. The error prediction is based on past history. Said in another way, previously desired inductor currents and the calculated presently desired inductor current are combined to produce a corrected inductor current that ideally gives perfect load compensation in the next half cycle. As an example, consider that inductor currents in three half cycles have been appropriately calculated and stored in an electrical storage unit. Taken as a whole, these three inductor currents have a tendency to indicate the character of a load disturbance and provide a possibility for predicting the inductor current required for proper compensation in the next half cycle. This, of course, generates a corrected inductor current $I_{L12,k}*$. This current is determined by the following relationship.

$$I_{L12,k}* = I_{L12,k} + a_1(I_{L12,k} - I_{L12,(k-1)}) + a_2(I_{L12,(k-1)} - I_{L12,(k-2)}) \quad (1)$$

or $$i\, I_{L12,k}* = I_{L12,k} + b_2 I_{L12,(k-1)} + b_3 I_{L12,(k-2)} \quad (2)$$

where $a_1$, $a_2$, $b_1$, $b_2$, and $b_3$ are constants. It has been found that good correction is obtained with $a_1=2$ and $a_2=-1$ (or $b_1=3$, $b_2=-3$, and $b_3=1$).

It is, of course, possible to estimate the corrected inductor current $I_{L12,k}*$ from any number of previously computed desired inductor currents, and thus, for example, equation (3) can be generalized in the following way:

$$I*_{L12,k} = \sum_{n=m}^{n=k} c_n I_{L12,n} \quad (3)$$

where n, m, k are integers (m<n) and each $c_n$ is an appropriately chosen constant.

FIG. 3 shows apparatus for implementing the relationships set forth in equation (2). As FIG. 3 shows, there is an electrical system 10 which comprises a three-phase line. The three-phase line feeds a transformer TT which in turn drives a load LD, which for purposes of illustration, may be an arc furnace. An arc furnace is chosen because of its rapidly varying load characteristics. The arc furnace draws the three-phase instantaneous line currents $i_{l1}$, $i_{l2}$ and $i_{l3}$ in each of the three lines. The terminal voltages for each of the three lines is designated $v_{T1}$, $v_{T2}$ and $v_{T3}$, respectively. These terminal voltages are derived from source voltages $v_1$, $v_2$ and $v_3$, respectively. The difference between the terminal voltage and source voltages is represented by the voltage drop across the line impedances Z1, Z2, Z3, respectively, as influenced by the flow of electrical current therethrough. A compensating VAR generator circuit SVG is provided for monitoring the line currents and terminal voltages on a half cycle by half cycle basis in such a manner as to provide compensating current $i_{v1}$, $i_{v2}$ and $i_{v3}$, respectively for the three-phase lines characterized by the terminal voltages $v_{T1}$, $v_{T2}$ and $v_{T3}$, respectively. In a preferred embodiment of the invention, the static VAR generator includes a compensating section CO in which three generally, but not necessarily, identical current producing sections are connected in $\Delta$ circuit configuration. Utilizing the arrangement for phase 1-2 as an example, an interconnection arrangement will be described which applies equally for the other two phases. In regard to phase 1-2, there is an inductor L12 connected in series circuit relationship with the parallel combination of oppositely disposed thyristor switches TH12. The total circuit arrangement is then connected in parallel with the fixed capacitor C12. The capacitive current $i_{C12}$ which flows through the capacitor C12 is generally fixed. From this current is subtracted a determinable or variable amount of inductor current $i_{L12}$, the magnitude of which is a function of the phase back angle $\alpha$ of the thyristor switch TH12 in each cycle. Consequently, the amount of reactive power provided to phase 1-2 in each half cycle is a function of the phase back angle $\alpha$. Control apparatus CA, which may be similar to control apparatus taught in the previously described U.S. Pat. No. 3,999,117 for computing the desired current in a thyristor controlled inductor is interconnected with the electrical system 10 in such a manner as to sense the line currents $i_{l1}$, $i_{l2}$, and $i_{l3}$ for the purpose of providing fixed current signals $I_{L12,k}$, $I_{L23,k}$ and $I_{L31,k}$ which are representative of the amount of current flowing in the lines during a given half cycle. These determined or calculated current values are then provided to predictors PRD12, PRD23, and PRD31, respectively, where appropriate actions take place in successive half cycles for providing corrected current values $I_{L12}{}^*$, $I_{L23}{}^*$, respectively. These latter signals are provided to an inductor current to firing angle converter ALG where firing angles $\alpha_{12}$, $\alpha_{23}$ and $\alpha_{31}$ are produced, respectively. These firing angle signals are then provided to a firing pulse generator PG where pulses $P_{12}$, $P_{23}$ and $P_{31}$ are provided to the thyristors TH12, TH23 and TH31, respectively, for actuating the thyristor switches for thereby providing the appropriate compensating currents. The inductor current-to-firing-angle converter ALG may in some embodiments of the invention utilize voltage signals which may or may not be interconnected with the electrical system 10 for producing certain desired effects, as is indicated in the previously described U.S. Pat. No. 3,999,117. Furthermore, a timing generator TWG may be interconnected with the lines of the electrical system 10 to provide timing signals for synchronizing the actions of the various control apparatus in the control system. The operation of a timing generator is also described with respect to the previously mentioned U.S. Pat. No. 3,999,117.

For purposes of illustration, the arrangement of the circuit elements for the predictor PRD12 is shown in detail in FIG. 3. It is to be understood that the arrangements for the predictor circuits PRD23 and PRD31 may be essentially similar. Furthermore, even though the predictor circuits shown herein are preferred embodiments, they are not necessarily limiting. Predictor PRD12 includes a shift register device SH2 which is serially interconnected with a second shift register device SH3. One output line from the computing device CA is interconnected with the input of the shift register device SH2. Consequently, it can be seen that the value of currents $I_{L12}$ for the last three successive half cycles of current calculation may be stored and utilized in combination to predict the inductor current value $I_{L12(k)}{}^*$ for the next half cycle. In accordance with the relationship set forth in equation (2), the output current $I_{L12,k}$ is supplied by way of scaling resistor $R/b_1$ to the positive input terminal of an integrator DA1. Likewise, the output of the shift register SH3, namely the current $I_{L12,(k-2)}$ is provided by way of scaling resistor $R/b_3$ to the same input terminal of the integrator DA1. Finally, the output of the shift register SH2, namely the current $I_{L12,(k-1)}$ is provided by way of scaling resistor $R/b_2$ to the negative input terminal of the integrator DA1. The output signal from the integrator is the signal $I_{L12,k}{}^*$. As can be seen, the actual amount of current $I_{L12,k}{}^*$ which is applied in the kth half cycle to the thyristor TH12 for causing compensation is related to a computed or determined value $I_{L12,k}$ and to previously determined values $I_{L12,(k-1)}$ and $I_{L12,(k-2)}$. The utilization of past history currents and the trend which is projected thereby tends to provide increasingly accurate compensating reactive power for the circuit 10.

Figure 4:
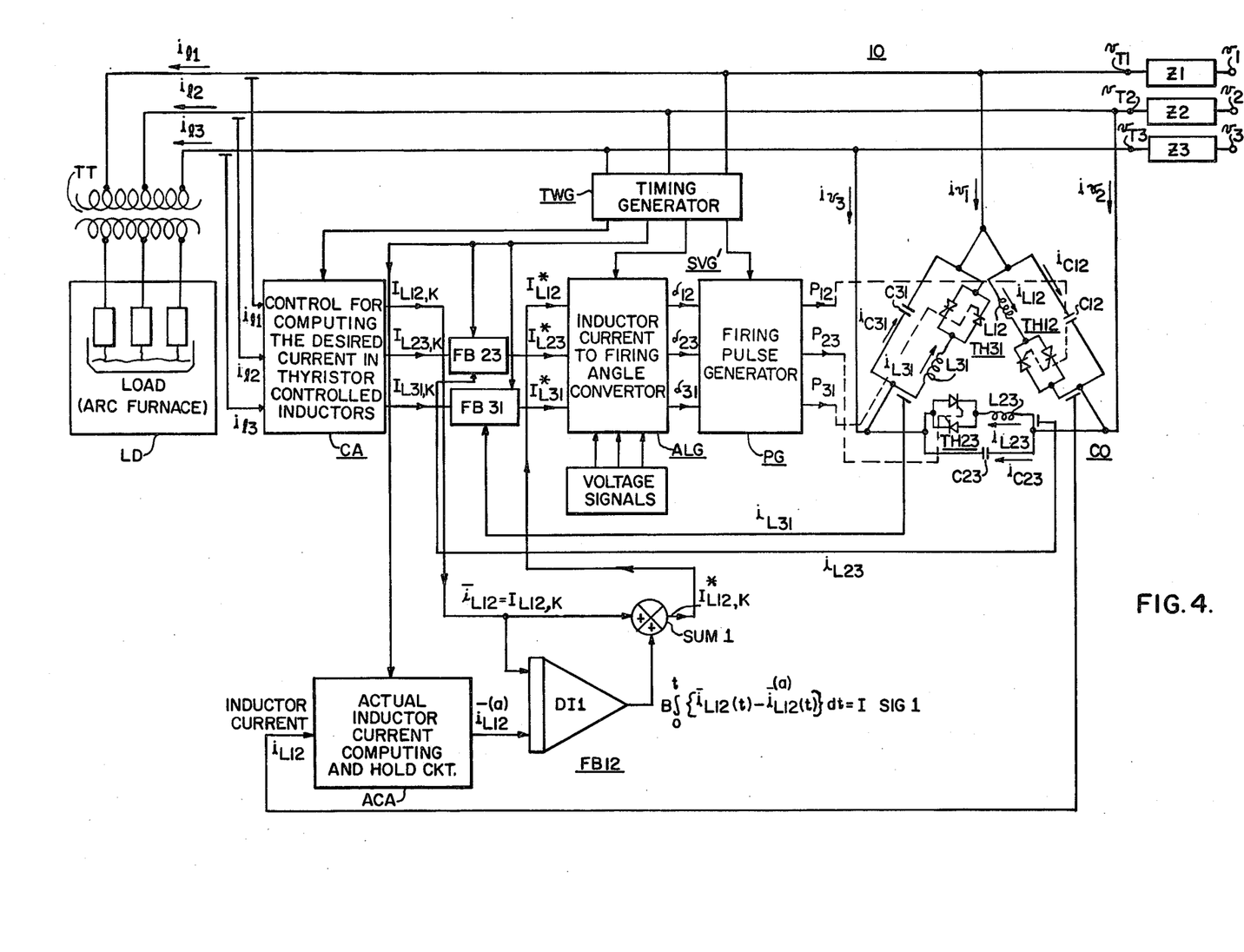
FIG. 4 shows a static VAR generator control system in which applied compensating current is utilized with predicted compensating current for determining compensating current in the next interval.

Referring to FIG. 4, a static VAR generator SVG' for the electrical system 10 in which a current feedback operation is utilized as shown. In this case, the timing generator TWG, the current computer circuit CA, the inductor current-to-firing-angle converter ALG, the firing pulse generator PG and the compensator or reactive power delivering circuit CO are essentially the same as those described with respect to FIG. 3. For simplicity of illustration and efficiency of disclosure, their operation will not be repeated. However, as can be seen by close reference to FIG. 4, feedback elements FB12, FB23 and FB31 are provided. In each case, an input to the feedback systems FB12, FB23 and FB31 comes from the current calculator CA in the form of successively calculated half cycle current signals designated $\bar{i}_{L12}$, $\bar{i}_{L23}$ and $\bar{i}_{L31}$, respectively. Furthermore, signals representing the applied inductor currents $\bar{i}_{L12}{}^{(a)}$, $\bar{i}_{L23}{}^{(a)}$, and $\bar{i}_{L31}{}^{(a)}$ (the latter two not shown) are provided by continuously monitoring the inductor current $i_{L12}$, $i_{L23}$ and $i_{L31}$, respectively. Each of the feedback elements FB12, FB23 and FB31 is timed or synchronized in an appropriate manner by signals from the timing generator TWG. FIG. 4 shows a preferred embodiment for appratus which utilizes a closed loop control. This control develops an error signal that is proportional to the difference between the computed and applied inductor currents and then utilizes this signal in a feedback loop to modify the firing angle of the thyristor switch to reduce this difference for the next half cycle.

The desired inductor current signals, $\bar{i}_{L12}$, $\bar{i}_{L23}$, and $\bar{i}_{L31}$ are real time functions representing the magnitudes of the desired inductor currents calculated in successive half cycles of the corresponding voltages $v_{T12}$, $v_{T23}$, and $v_{T31}$, respectively. Similarly, applied inductor current signals $\bar{i}_{L12}{}^{(a)}$, $\bar{i}_{L23}{}^{(a)}$, and $\bar{i}_{L31}{}^{(a)}$ are time functions representing the magnitudes of the applied inductor currents in the said successive half cycles. Thus, for example, signal $\bar{i}_{L12} = \bar{i}_{L12}(t)$ and $\bar{i}_{L12}{}^{(a)} = \bar{i}_{L12}{}^{(a)}(t)$, (where t indicates that both $\bar{i}_{L12}$ and $\bar{i}_{L12}{}^{(a)}$ is a function of time), can be defined with the magnitudes of the successive computed and applied inductor currents as shown in equations (4) and (5):

$$\bar{i}_{L12}(t) = I_{L12,(k-2)} \quad (k-3)\frac{\pi}{\omega} < t \leq (k-2)\frac{\pi}{\omega} \quad (4)$$

$$\bar{i}_{L12}(t) = I_{L12,(k-1)} \quad (k-2)\frac{\pi}{\omega} < t \leq (k-1)\frac{\pi}{\omega}$$

$$\bar{i}_{L12}(t) = I_{L12,k} \quad (k-3)\frac{\pi}{\omega} < t \leq k\frac{\pi}{\omega}$$

.
.
and

-continued $$\bar{i}_{L12}^{(a)}(t) = I_{L12,(k-2)}^{(a)} \quad (k-3)\frac{\pi}{\omega} < t \leq (k-2)\frac{\pi}{\omega} \quad (5)$$

$$\bar{i}_{L12}^{(a)}(t) = I_{L12,(k-1)}^{(a)} \quad (k-2)\frac{\pi}{\omega} < t \leq (k-1)\frac{\pi}{\omega}$$

$$\bar{i}_{L12}^{(a)}(t) = I_{L12,k}^{(a)} \quad (k-1)\frac{\pi}{\omega} < t \leq k\frac{\pi}{\omega}$$

The error, $\epsilon_{12}(t)$, between the two functions representing the computed and applied inductor currents is defined as follows:

$$\epsilon_{12}(t) = \bar{i}_{L12}(t) - \bar{i}_{L12}^{(a)}(t) \quad (6)$$

With the above definitions, the corrected inductive current, $I_{L12,k}^*$, applied in the kth half cycle can be defined as follows:

$$I_{L12,k}^* = I_{L12,k} + A\epsilon_{12}(t) \quad (7)$$

or, $$I_{L12,k}^* = I_{L12,k} + B \int_0^t \epsilon_{12}(t) dt \quad (8)$$

where A and B are gain constants. Equation (8) expresses the steady-state zero error demand of the control scheme.

Essentially, the feedback apparatus, as is best shown at FB12, solves the equation (8). The actual inductor current $i_{L12}$ flowing in any cycle is converted in each half cycle by way of an actual inductor current computing and hold circuit ACA to an average value $\bar{i}_{L12}^{(a)}$. This signal is combined with the average value signal $\bar{i}_{L12}$ representing the calculated current $I_{L12}$ for application in the next succeeding half cycle. The difference is integrated and scaled by the scale factor B in an integrator DI1. The output signal ISIG1 is summed in the summer SUM1 with the signal $\bar{i}_{L12}$ ($I_{L12}$) to form the correction signal $I_{L12}^*$. This signal is then provided to the inductor current firing angle converter ALG in the manner previously described with respect to FIG. 3 to cause the generation of a pulse P12 at an appropriate phase back angle $\alpha 12$ for use in applying the appropriate amount of compensating current to the system 10 for the phase 1-2.

Figure 5:
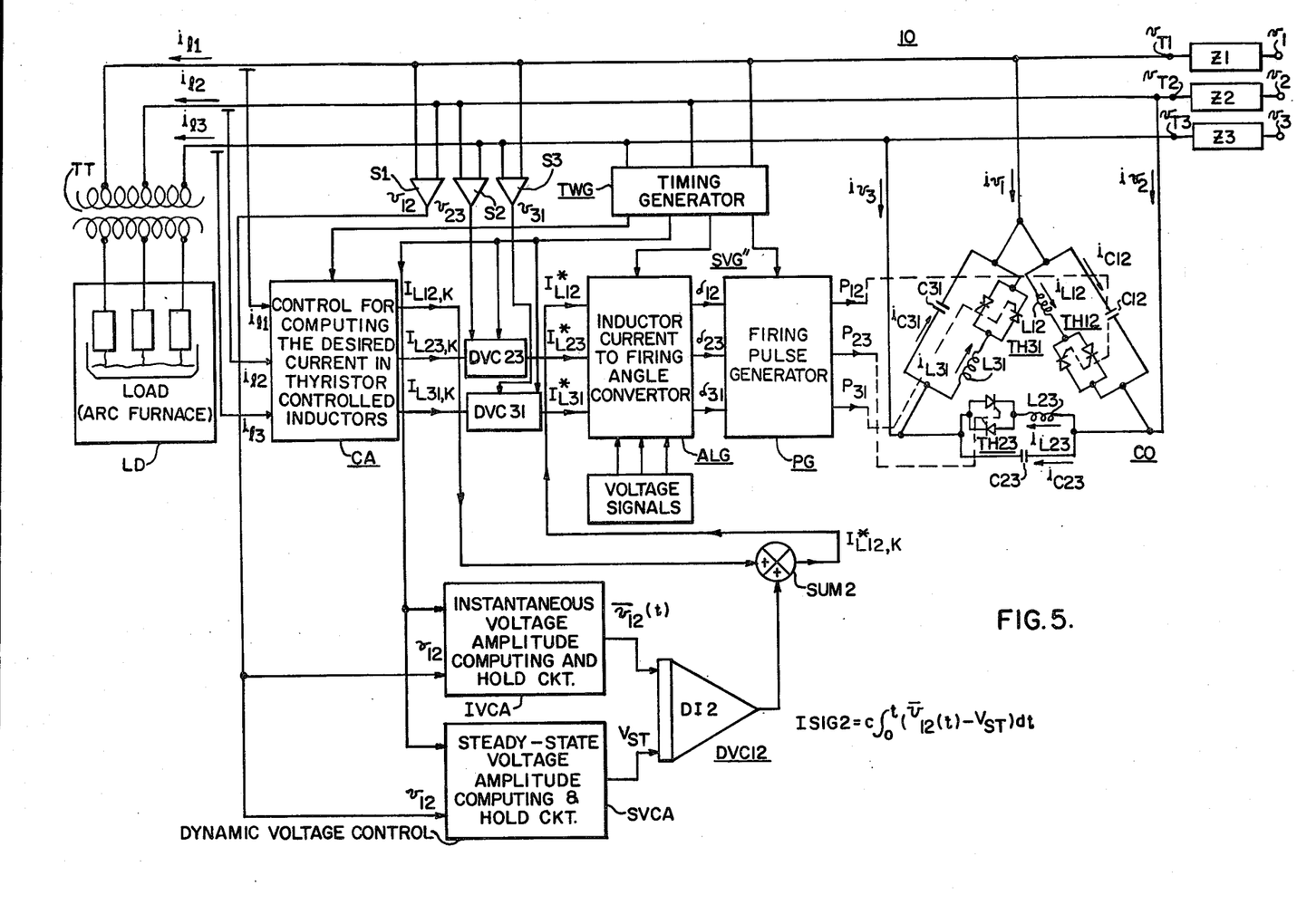
FIG. 5 shows a static VAR generator control system in which present phase voltage is utilized in conjunction with computed inductor current for determining the amount of inductor current that is to be actually applied in the next time interval.

Referring now to FIG. 5, still another embodiment of the invention is shown in which the compensation error is reduced by a voltage feedback technique.

The compensation error of the VAR generator can be reduced by the indirect method of detecting the instantaneous deviation of the terminal voltage from its steady state value, and using this as an error signal in a feedback loop to modify the firing angle that corresponds to the desired inductor current to reduce this voltage deviation.

The magnitude of the inductor current corrected with the above voltage feedback technique can be expressed for the kth half cycle as follows:

$$I_{L12,k}^* = I_{L12,k} + c \int_0^t (\bar{v}_{12}(t) - V_{ST}) dt \quad (9)$$

where $$\bar{v}_{12}(t) = V_{12,k} \quad (k-1)\frac{\pi}{\omega} < t \leq k\frac{\pi}{\omega} \quad (10)$$

$$\bar{v}_{12}(t) = V_{12,(k-1)} \quad (k-2)\frac{\pi}{\omega} < t \leq (k-1)\frac{\pi}{\omega}$$

$$\bar{v}_{12}(t) = V_{12,(k-2)} \quad (k-3)\frac{\pi}{\omega} < t \leq (k-2)\frac{\pi}{\omega}$$

in which $V_{12,k}$, $V_{12,(k-1)}$, ... are the amplitudes of the terminal voltage $v_{12}$ in the kth, (K−1)th, etc., half cycles.

$V_{ST}$ is the amplitude of the terminal voltage $v_{12}$ averaged over time interval $$(k-l)\frac{\pi}{\omega} - k\frac{\pi}{\omega}$$

to obtain the "steady state amplitude", that is $$V_{ST} = \frac{1}{t_1 - t_2} \int_{(k-l)\frac{\pi}{\omega}}^{k\frac{\pi}{\omega}} v_{12}(t) dt, l << k. \quad (11)$$

c is a gain constant.

The correction signal $$ISIG2 = c \int_0^t (\bar{v}_{12}(t) - V_{ST}) dt \quad (12)$$

of equation (9) is derived from the terminal voltage $v_{12}$, and is summed to desired inductor current $I_{L12}$ to provide the corrected inductor current $I_{L12}^*$. It can therefore be seen that the correction factor ISIG2 is a function of voltage. The actually applied inductor current $I_{L12,k}^*$ is a function of the correction factor ISIG2 and the calculated inductor current $I_{L12,k}$.

The apparatus shown in FIG. 5 is operated essentially the same as that shown with respect to FIGS. 3 and 4, except for the operation of the summing amplifiers S1, S2 and S3 and the voltage feedback apparatus DVC12, DVC23 and DVC31. Once again, for convenience of illustration and efficiency of disclosure, the operation of previously described portions of the apparatus will not be repeated. The operation of the voltage feedback apparatus DVC23 and DVC31 is essentially the same as the operation of the voltage feedback apparatus DVC12. Consequently, the operation of the voltage feedback apparatus DVC12 will be the only one described herein. The apparatus DVC12 essentially implements equation (9). The instantaneous voltage $v_{12}$ derived from the summing amplifier S1 is provided concurrently to an instantaneous-voltage-amplitude-computing-and-hold circuit IVCA and to a steady-state-voltage-amplitude-computing-and-hold circuit SVCA for producing the signals $\bar{v}_{12}(t)$ and the signal $V_{ST}$, respectively. In accordance with equation (9), the difference between these signals in any given half cycle is integrated and scaled in the integrator device DI2 to provide the output signal ISIG2. This signal is then summed with the computed or desired current signal $I_{L12}$ to produce a new or corrected current signal $I_{L12}^*$. This signal is provided to the inductor-current-and-firing angle converter ALG to ultimately provide the appropriate compensating current.

It is to be understood with respect to the embodiments of the invention that the teachings herein are not limited to circuits with any particular number of phases. The teachings and apparatus associated therewith may be utilized on single-phase and multi-phase circuits, including three-phase circuits. It is also to be understood that the particular arrangement of the sensing devices and the compensating power device is not limiting, nor is the particular interconnection thereof to the electrical system which is to be controlled. It is also to be understood that even though the embodiments of this invention are directed at the generation of reactive current or power for the compensation of rapidly varying loads, the apparatus may be utilized for general voltage support in a slowly varying system. That is to say, the invention is not limited to "flicker control". It is also to be understood that the particular apparatus taught herein for implementing the concepts of the present invention is not necessarily limiting, and other apparatus which may be envisioned for providing the desirable inventive interaction of circuit components and circuit variables may be utilized. It is also to be understood that the apparatus taught herein is not limited to those situations in which the firing angle is computed necessarily entirely in the voltage half cycle preceding the time at which the current half cycle in which correction is to take place occurs, it being understood that apparatus has now been discovered which allows the computation technique to continue into the electrical current half cycle in which correction is to be applied. It is also to be understood that the frequency of operation of the apparatus may be 50 hz or 60 hz, for example.

The apparatus taught with respect to the embodiments of this invention has many advantages. One advantage lies in the fact that the effects of a rapidly varying load may be compensated by a static VAR generator with a high degree of accuracy by minimizing error due to the time lag which may exist between the time that the expected value of compensating current is computed or determined and the time at which it is actually applied for compensation. Another advantage lies in the fact that the sensing of real time voltage may be utilized for generating an error signal for subsequent provision of more accurate compensating current. Another advantage lies in the fact that real time current may be sensed for the same purpose. Another advantage lies in the fact that successively stored values of previously determined values of compensating current may be utilized to establish a trend for application to the most recently determined current signal for correcting that signal.

What we claim as our invention is:

1. A VAR generator of the type which is connected to an electrical system for the purpose of supplying reactive power to the electrical system, comprising:
   (a) calculating means for determining an estimated amount of reactive power that is to be provided to said electrical system during a given period of time, said calculating means providing an estimated reactive power output signal which is related to said estimated amount of reactive power;
   (b) predictor means connected to receive said estimated reactive power output signal from said calculating means for weighing said later signal by a first amount and for adding said weighed later signal to a previously stored estimated reactive power output signal which has been weighed by a second amount to form a predictor means output signal; and
   (c) reactive power producing means connected to said electrical system and said predictor means for providing reactive power during said time period in correspondence to said predictor means output signal.

2. A VAR generator of the type which is connected to an alternating current electrical system for the purpose of monitoring the electrical system current and system voltage to thus provide reactive power to the electrical system during successive half cycles of system voltage, comprising:
   (a) a thyristor-controlled-inductor connected in circuit relationship with a fixed capacitor, said later circuit combination being connected in appropriate circuit relationship with said electrical system for supplying said reactive power to said electrical system, the amount of said reactive power supplied during each half cycle of system voltage being a function of the thyristor phase back angle ($\alpha$); and
   (b) control means connected in appropriate circuit relationship with said electrical system to measure system voltage and current for estimating in a given half cycle of system voltage the amount of inductor current which is apparently necessary to provide a value of reactive power to said electrical system in a succeeding half cycle sufficient to maintain said system voltage and said system current in a generally fixed phase relationship within limits during said succeeding half cycle, said control means also being interconnected with said thyristor-controlled-inductor for providing a composite output signal thereto for varying said phase back angle ($\alpha$), said composite output signal being related to the sum of said estimated amount of inductor current as weighed by a first predetermined amount and the estimated amount of inductor current determined in a previous half cycle as weighed by a second predetermined amount.

3. A VAR generator of the type which is connected across two conductors of an electrical system for the purpose of supplying reactive power to the system, comprising:
   (a) calculating means connected in circuit relationship with said conductors for estimating the amount of reactive power that is to be provided to said electrical system during a given period of time as a function of a circuit variable and for providing an output signal related to the estimated amount of reactive power;
   (b) storage means interconnected with said calculating means for storing information related to the amount of reactive power previously provided to said electrical system and for providing an output signal related to the amount of previously provided reactive power;
   (c) predictor means connected to said calculating means and said storage means for receiving said output signal from said calculating means for weighing said later signal by a first amount, said predictor means also receiving said output signal from said storage means and weighing said later signal by a second amount, said first weighed signal and said second weighed signal being added to form a predictor means output signal; and
   (d) VAR generation means interconnected with said electrical system and with said predictor means for utilizing said predictor means output signal to provide the actual amount of reactive power which is applied to said electrical system during said given period of time.

4. The combination as claimed in claim 3 wherein said given period of time comprises the time span of one-half cycle of alternating electrical voltage between said two conductors of said electrical system.

5. The combination as claimed in claim 4 wherein said previously provided reactive power is provided in the one-half cycle of said alternating electrical voltage immediately preceding said one-half cycle of said given period of time.

6. A VAR generator of the type which is connected across two conductors of an electrical system for the purpose of supplying reactive power to the system, comprising:

(a) calculating means connected in circuit relationship with said conductors for estimating the amount of reactive power that is to be provided to said electrical system during a given period of time as a function of circuit variables and for providing an output current ($I_{L12,k}$) related to the estimated amount of reactive power;

(b) storage means interconnected with said calculating means for storing information related to the amount of reactive power previously provided to said electrical system and for providing an output current ($I_{L12,(k-1)}$) related to the amount of previously provided reactive power;

(c) predictor means connected to said calculating means and said storage means for receiving said output current from said calculating means and for weighing said later signal by a first amount (b1), said predictor means also receiving said output current from said storage means and weighing said later signal by a second amount (b2), said first weighed current and said second weighed current being added to form a predictor means output current ($I_{L12,k}^*$); and (d) VAR generation means interconnected with said predictor means for converting said predictor means output current to the actual amount of reactive power which is applied to said electrical system during said given period of time.

7. The combination as claimed in claim 6 wherein said given period of time comprises the time span of one-half cycle of alternating electrical voltage between said two conductors of said electrical system.

8. The combination as claimed in claim 7 wherein said previously provided reactive power is provided in the one-half cycle of said alternating electrical voltage immediately preceding said one-half cycle of said given period of time.

9. The combination as claimed in claim 6 wherein in said amount of reactive power (VAR) which is applied to said electrical system during said given period of time is defined by the following relationship:

Reactive power is proportional to:

$$\sum_{n=m}^{n=k} c_n I_{L12,n}.$$

10. The combination as claimed in claim 7 wherein said alternating electrical voltage has a frequency of 60 hz.

11. The combination as claimed in claim 7 wherein said alternating electrical voltage has a frequency of 50 hz.

12. A VAR generator of the type which is connected to an electrical system for the purpose of supplying reactive power to the electrical system, comprising:

(a) calculating means for determining an estimated amount of reactive power that is to be provided to said electrical system during a given period of time, said calculating means providing an estimated-reactive-power-output signal which is related to said estimated amount of reactive power;

(b) measuring means for determining the actual amount of reactive power delivered to said electrical system prior to said given period of time, said measuring means providing an actual-reactive-power-output signal which is related to said measured amount of reactive power;

(c) integrator means connected to receive said estimated-reactive-power-output signal from said calculating means and said actual-reactive-power-output signal from said measuring means for integrating the difference between said later two signals and providing an integrator-means-output signal relative to the integrated difference;

(d) summation means connected to also receive said estimated-reactive-power-output signal and to receive said integrator-means-output signal, said estimated-reactive-power-output-signal being changed by said integrator-means-output signal to provide a summation-means-output-signal; and (e) reactive power producing means connected to said electrical system and said summation means for providing reactive power during said time period in correspondence to said summation-means-output signal.

13. A VAR generator of the type which is connected to an alternating current electrical system for the purpose of monitoring the electrical system current and system voltage to thus provide reactive power to the electrical system during successive half cycles of system voltage, comprising:

(a) a thyristor-controlled-inductor connected in circuit relationship with a fixed capacitor, said later circuit combination being connected in appropriate circuit relationship with said electrical system for supplying said reactive power to said electrical system, the amount of said reactive power supplied during each half cycle of system voltage being a function of the thyristor phase back angle ($\alpha$); and (b) control means connected in appropriate circuit relationship with said electrical system to measure system voltage and current for estimating in a given half cycle of system voltage the amount of inductor current which is apparently necessary to provide a value of reactive power to said electrical system in a succeeding half cycle sufficient to maintain said system voltage and said system current in a generally fixed phase relationship within limits during said succeeding half cycle, said control means also being interconnected with said thyristor-controlled-inductor for providing an output signal thereto for varying said phase back angle ($\alpha$), said output signal being related to the sum of said estimated amount of inductor current and an error, said error being related to the integrated difference between said estimated amount of inductor current and an actual amount of inductor current present in said given half cycle.

14. A VAR generator of the type which is connected across two conductors of an electrical system for the purpose of supplying reactive power to the system, comprising:
(a) calculating means connected in circuit relationship with said conductors for estimating the amount of reactive power that is to be provided to said electrical system during a given period of time as a function of a circuit variable and for providing an output signal related to the estimated amount of reactive power;
(b) reactive power producing means connected to said electrical system for providing reactive power thereto;
(c) measuring means interconnected with said reactive power producing means for measuring the actual amount of reactive power delivered to said electrical system prior to said given period of time, said measuring means providing an actual-reactive-power output signal which is related to said measured amount of reactive power;
(d) integrator means connected to receive said output signal from said calculating means and said actual-reactive-power output signal from said measuring means for integrating the difference between said later two signals and for providing an integrator-means output signal related to the integrated difference; and
(e) summation means connected to receive said output signal from said calculating means and to receive said integrator-means-output signal, said output signal from said calculating means being changed by said integrator-means-output signal to provide a summation-means output signal, said summation means being connected to said reactive power producing means for providing reactive power during said time period in correspondence to said summation means output signal.

15. The combination as claimed in claim 14 wherein said given period of time comprises the time span of one-half cycle of alternating electrical voltage between said two conductors of said electrical system.

16. A VAR generator of the type which is connected across two conductors of an electrical system for the purpose of supplying reactive power to the system, comprising:
(a) calculating means connected in circuit relationship with said conductors for estimating the amount of reactive power that is to be provided to said electrical system during a given period of time as a function of a circuit variable and for providing an output current ($\bar{i}_{12}(t)$) related to the estimated amount of reactive power;
(b) reactive power producing means connected to said electrical system for providing reactive power thereto;
(c) measuring means interconnected with said reactive power producing means for measuring the actual amount of reactive power delivered to said electrical system prior to said given period of time, said measuring means providing an actual-reactive-power output signal ($\bar{i}_{L12}^{(a)}(t)$) which is related to said measured amount of reactive power;
(d) integrator means connected to receive said output current from said calculating means and said actual-reactive-power output signal from said measuring means for integrating the difference between said later two signals and providing an integrator-means output current (ISIG1) related to the integrated difference; and
(e) summation means connected to also receive said output current from said calculating means and to receive said integrator-means-output-current, said estimated-power-output current being changed by said integrator-means-output current to provide summation-means output current ($I_{L12}^*$), said summation means being connected to said reactive power producing means for providing reactive power during said time period in correspondence to said summation-means output current.

17. The combination as claimed in claim 16 wherein said given period of time comprises the time span of one-half cycle of alternating electrical voltage between said two conductors of said electrical system.

18. The combination as claimed in claim 16 wherein said amount of reactive power (VAR) which is applied to said electrical system during said given period of time is defined by the following relationship:
Reactive power is proportional to:

$$I_{L12,k} + B \int_0^t [\bar{i}_{L12}(t) - \bar{i}_{L12}^{(a)}(t)] \, dt.$$

19. The combination as claimed in claim 17 wherein said alternating electrical voltage has a frequency of 60 hz.

20. The combination as claimed in claim 17 wherein said alternating electrical voltage has a frequency of 50 hz.

21. A VAR generator of the type which is connected to an electrical system for the purpose of supplying reactive power to the electrical system, comprising:
(a) calculating means for determining an estimated amount of reactive power that is to be provided to said electrical system during a given period of time, said calculating means providing an estimated-reactive-power-output signal which is related to said estimated amount of reactive power;
(b) voltage-magnitude-determining means for determining voltage magnitude in said electrical system, said voltage-magnitude-determining means providing a voltage-magnitude-output signal which is related to said voltage magnitude in said electrical system; and
(c) reactive power producing means connected to said electrical system and to said calculating means and to said voltage-magnitude-determining means for providing said reactive power during said time period in correspondence to said estimated-reactive-power-output signal and said voltage-magnitude-output signal.

22. A VAR generator of the type which is connected to an alternating current electrical system for the purpose of monitoring the electrical system current and system voltage to thus provide reactive power to the electrical system during successive half cycles of system voltage, comprising:
(a) a thyristor-controlled-inductor connected in circuit relationship with a fixed capacitor, said later circuit combination being connected in appropriate circuit relationship with said electrical system for supplying said reactive power to said electrical system, the amount of said reactive power supplied during each half cycle of system voltage being a function of the thyristor phase back angle (α); and (b) control means connected in appropriate circuit relationship with said electrical system to measure system voltage and current for estimating in a given half cycle of system voltage the amount of inductor current which is apparently necessary to provide a value of reactive power to said electrical system in a succeeding half cycle sufficient to maintain said system voltage and said system current in a generally fixed phase relationship within limits during said succeeding half cycle, said control means comparing the amplitude of said system voltage during said given half cycle with a reference signal to provide an error signal, said control means also being interconnected with said thyristor-controlled-inductor for providing an output signal thereto for varying said phase back angle (α), said later output signal being related to the difference between said estimated amount of inductor current and a value which is related to said error signal.

23. A VAR generator of the type which is connected across two conductors of an electrical system for the purpose of supplying reactive power to the system, comprising:

(a) calculating means connected in circuit relationship with said conductors for estimating the amount of reactive power that is to be provided to said electrical system during a given period of time as a function of a circuit variable and for providing an estimated-power-output signal related to the estimated amount of reactive power;

(b) short range voltage amplitude determining means connected to said electrical system for measuring the amplitude of the voltage between said two conductors for a first interval of time which is prior to said given period of time, said short range voltage amplitude determining means providing a short range output signal which is related to said maximum amplitude of said voltage during said first interval of time;

(c) long range voltage amplitude determining means connected to said electrical system for measuring the amplitude of the voltage between said two conductors for a second interval of time which is also prior to said given period of time and which is substantially longer than said first interval of time, said long range voltage determining means providing a long range output signal which is related to said amplitude of said voltage averaged over said second interval;

(d) integrator means connected to receive said short range output signal and said long range output signal for integrating the difference between said later two signals and for providing an integrator-means-output signal related to the integrated difference;

(e) summation means connected to receive said estimated-power-output signal and to receive said integrator-means-output signal for providing a summation-means-output signal related to the difference therebetween; and (f) reactive power producing means connected to said electrical system and said summation means for utilizing said summation-means-output signal to provide the actual amount of reactive power which is applied to said electrical system during said given period of time.

24. The combination as claimed in claim 23 wherein said given period of time comprises the time span of one-half cycle of alternating electrical voltage between said two conductors of said electrical system, said first interval of time comprises the time span of the one-half cycle of alternating electrical voltage between said two conductors immediately preceding said one-half cycle of said given period of time, said second interval of time comprising the time span of a plurality of consecutive one-half cycles of said alternating electrical voltage immediately preceding said one-half cycle of said given period of time.

25. A VAR generator of the type which is connected across two conductors of an electrical system for the purpose of supplying reactive power to the system, comprising:

(a) calculating means connected in circuit relationship with said conductors for estimating the amount of reactive power that is to be provided to said electrical system during a given period of time as a function of a circuit current and for providing an estimated-power-output current ($I_{L12,k}$) related to the estimated amount of reactive power;

(b) short range voltage amplitude determining means connected to said electrical system for measuring the amplitude of the voltage between said two conductors for a first interval of time which is prior to said given period of time, said short range voltage amplitude determining means providing a short range output voltage signal ($\bar{v}_{12}(t)$) which is related to said maximum amplitude of said voltage during said first interval of time;

(c) long range voltage amplitude determining means connected to said electrical system for measuring the amplitude of the voltage between said two conductors for a second interval of time which is also prior to said given period of time and which is substantially longer than said first interval of time, said long range voltage determining means providing a long range output voltage signal ($V_{ST}$) which is related to said amplitude of said voltage averaged over said second interval;

(d) integrator means connected to receive said short range output voltage signal and said long range output voltage signal for integrating the difference between said later two voltage signals and for providing an integrator-means-output signal (IS1G2) related to the integrated difference;

(e) summation means connected to receive said estimated-power-output current and to receive said integrator-means-output signal for providing a summation-means output signal ($I_{L12}^*$) related to the difference therebetween; and (f) reactive power producing means connected to said electrical system and said summation means for utilizing said summation-means-output signal to provide the actual amount of reactive power which is applied to said electrical system during said given period of time.

26. The combination as claimed in claim 25 wherein said given period of time comprises the time span of one-half cycle of alternating electrical voltage between said two conductors of said electrical system, said first interval of time comprises the time span of one-half cycle of alternating electrical voltage between said two conductors immediately preceding said one-half cycle of said given period of time, said second interval of time comprising the time span of a plurality of consecutive one-half cycles of said alternating electrical voltage immediately preceding said one-half cycle of said given period of time.

27. The combination as claimed in claim 25 wherein said amount of reactive power (VAR) which is applied to said electrical system during said given period of time is defined by the following relationship:

Reactive power is proportional to:

$$I_{L12,k} + C \int_0^t [\bar{v}_{12}(t) - V_{ST}] dt.$$

28. The combination as claimed in claim 26 wherein said alternating electrical voltage has a frequency of 60 hz.

29. The combination as claimed in claim 26 wherein said alternating electrical voltage has a frequency of 50 hz.

* * * * *